United States Patent [19]

Schmuck

[11] 4,329,095
[45] May 11, 1982

[54] POSITION INDICATOR FOR A MANUALLY OPERATED APPARATUS

[75] Inventor: Peter Schmuck, Mauren, Liechtenstein

[73] Assignee: Hilti Aktiengesellschaft, Schaand Furstentum, Liechtenstein

[21] Appl. No.: 165,146

[22] Filed: Jul. 1, 1980

[30] Foreign Application Priority Data

Jul. 18, 1979 [DE] Fed. Rep. of Germany ....... 2929073

[51] Int. Cl.³ .................. B23B 39/00; B23B 49/00
[52] U.S. Cl. ........................................ 408/112; 408/16
[58] Field of Search ...................... 408/16, 112, 116

[56] References Cited

U.S. PATENT DOCUMENTS

| | | | |
|---|---|---|---|
| 2,580,674 | 1/1952 | Griffin | 408/16 X |
| 2,670,638 | 3/1954 | Roy, Sr. | 408/112 |
| 3,242,773 | 3/1966 | Van Praag | 408/16 |
| 3,707,043 | 12/1972 | Jones | 408/112 X |
| 3,884,593 | 5/1975 | Christoffer | 408/16 |
| 4,250,971 | 2/1981 | Reibetanz et al. | 408/16 X |

FOREIGN PATENT DOCUMENTS

7041005  2/1971  Fed. Rep. of Germany .
7125963 10/1971  Fed. Rep. of Germany .

Primary Examiner—Harrison L. Hinson
Attorney, Agent, or Firm—Toren, McGeady & Stanger

[57] ABSTRACT

A manually operated apparatus for driving a member such as a tool or fastening element into the surface of a receiving material includes a device for driving the member, a base supportable on the surface into which the member is to be driven, and a holder attached to the device and pivotally connected to the base for providing a visual indication of an angular disposition of the drive axis of the device relative to the surface of the receiving material and for positioning the drive axis perpendicular to the surface.

7 Claims, 7 Drawing Figures

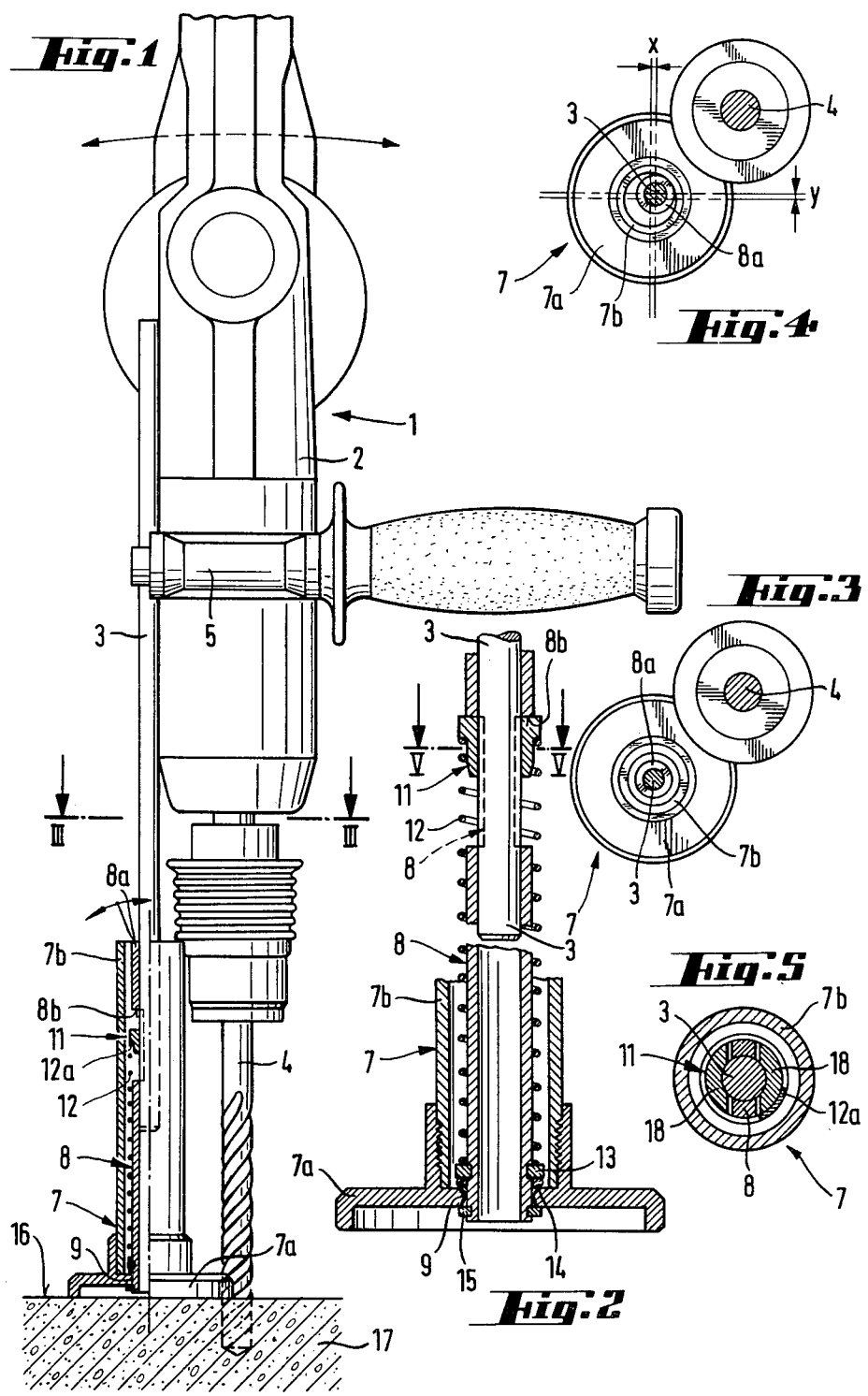

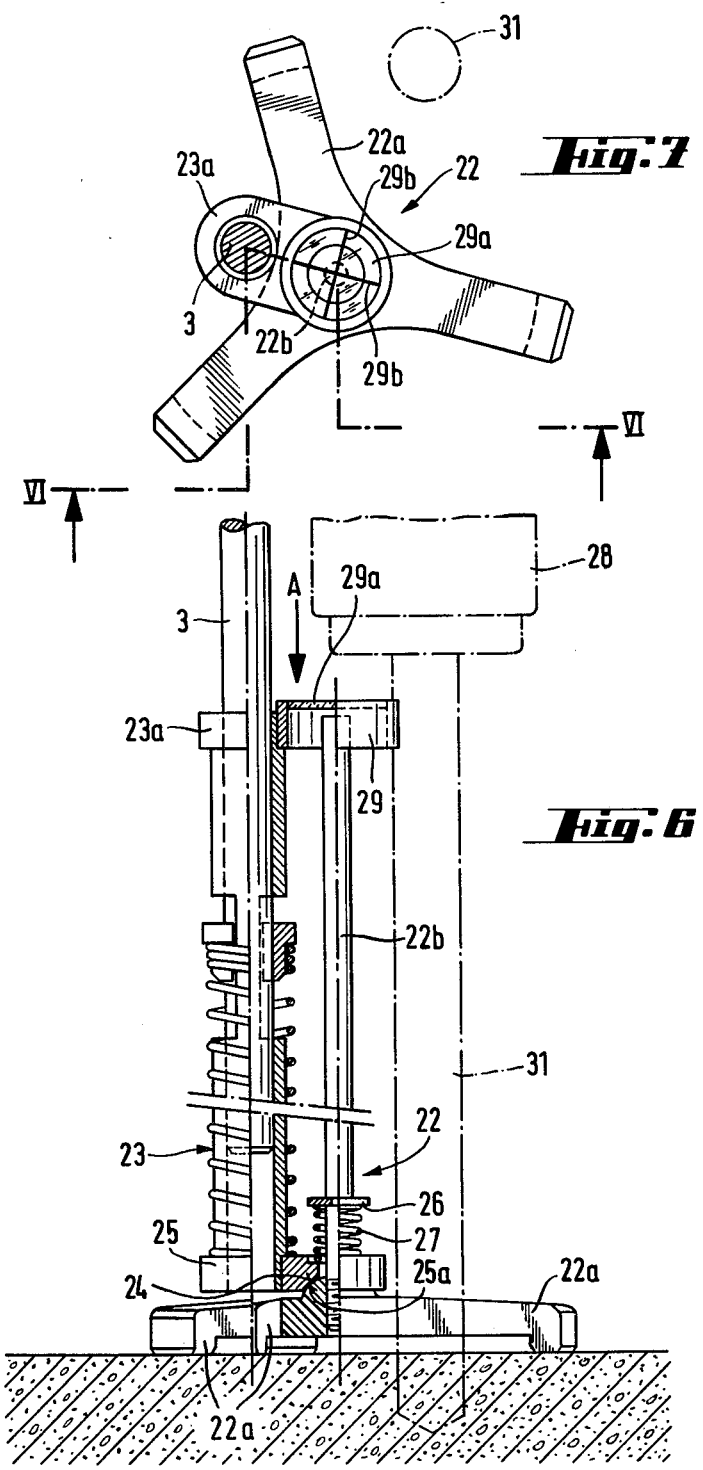

POSITION INDICATOR FOR A MANUALLY OPERATED APPARATUS

SUMMARY OF THE INVENTION

The present invention is directed to a manually operated apparatus including a manually operated device for driving members such as tools or fastening elements into the surface of a receiving material and, more particularly, to an indicator for affording a visual control of the angular disposition of the drive axis of the device relative to the surface of the workpiece into which a member is being driven.

The term "manually operated device" as used herein refers to drilling tools, hammer drills, stud drivers and other portable tools which have a working axis that is usually aligned perpendicularly to the surface into which the member is driven. When using such a manually operated device, it is necessary in most applications, for instance in a drill, to drive the drill bit into the receiving material, or in a stud driver, to drive a fastening element into the receiving material, so that it is inserted normal to the surface of the receiving material into which it is driven. Maintaining such perpendicularity often causes considerable problems for the operator. The drill must be guided at the commencement of operation and also during the entire drilling process, at the desired angle.

To prevent any misalignment of the drive axis during the drilling of a borehole, it is known in manually operated drills to provide a cylinder on the housing which is slidable relative to the housing. The forward end of the cylinder has a large area, off-center base. During the drilling operation, the forward end of the base is supported on the surface of the receiving material so that the cylinder and base move rearwardly relative to the housing of the device as the drill moves the drill bit forwardly into the receiving material. The support of the forward end face of the base against the surface of the receiving material is intended to facilitate the operation of drilling at a right angle to the surface. Accordingly, the forward end face of the base is manually maintained in contact with the surface of the material during the entire drilling operation. The entire forward end face of the base can be maintained in contact or a plurality of spaced contact points can be used for effecting contact.

Experience has shown when a drilling device is used on an uneven surface of a receiving material, and this applies especially to percussion drilling devices or hammers, that such guidance control effected by the manual handling of the tool by the operator is difficult to carry out. Particularly in larger tools or devices, because of the long lever arm involved, the proper support of the base against the surface of the receiving material is no longer perceptible to the operator by touch or feel unless the base has a radial projection which tends unduly to impair the operation of the device. Additionally, manually operated devices, especially hand-held drilling tools, are known which use levels for maintaining the perpendicular guidance of the device. Usually the levels are positioned on the housing of the tool. In German Utility Model No. 7,125,963 a manually operated drilling tool is illustrated having a tubular level arranged parallel to the drilling or drive axis so that guidance control in a horizontal drilling direction is possible. At the rear end of the tool housing a circular level is positioned for controlling the drive axis when the tool is used in a vertical direction.

Regardless of the fact that the use of levels as indicators in manually operated devices are by nature very sensitive and very easily damaged, when used in a vibrating tool or device, such levels have the disadvantage that the indicator bubble "runs" during operation because of the tool vibrations and a reliable guidance control is not attainable. When the surface of the receiving material is not horizontal or vertical the use of levels, particularly those firmly attached to the drilling tool housing, prevents control of perpendicularity relative to the surface of the receiving material.

Therefore, it is the primary object of the present invention to provide a manually operated apparatus of the type described above, incorporating an indicator that is easy to read and affords a positive registration of the right-angled position of the drilling or driving device relative to the surface of a receiving material.

In accordance with the present invention, the indicator includes a supporting base positionable on the surface of the material so that it can swivel or pivot relative to the drilling or driving device.

During placement of the manually operated apparatus on the surface of a receiving material, the forward end of the base is supported over a large area of the surface so that the forward end face of the base adjusts to the inclination of the penetration surface. If the portable or manually operated device used in the apparatus is a drilling tool, then the base is maintained in contact with the surface during operation of the device so that support is assured even during any misalignment of the driving or drilling axis of the device relative to the surface. If such misalignment occurs, this becomes apparent due to the oblique angular relationship between the base and the drive axis of the manually operated device. With the appropriate correction of the device, the necessary parallel alignment of the axis of the supporting base and of the drill axis of the device can be adjusted to maintain right-angled penetration of the member in the device.

Therefore, a considerable advantage of the present invention is the presence of a visual indicator displaying the relative angular disposition of the drive axis of the device with respect to the surface into which a member is to be driven, independent of the absolute operating direction of the manually operated device. This apparatus is distinguishable over the previously used position control means due to its readability during operation and there is the additional advantage that the indicator is of a sturdy construction and is not sensitive to normal operating conditions.

The indicator can, in total, be constructed as a cylindrical tube. However, a supporting base is also suitable having a plate-shaped member at its forward end which may include angularly spaced legs for support on the surface of the receiving material and with a tubular shaft of smaller diameter extending rearwardly from the plate. It is practical if the supporting base is mounted off-center relative to the drive axis of the manually operated device so that the indicator can be directly attached to the device housing. Preferably, the supporting base is pivotally connected with a holder and is slidable in the forward or drive direction with respect to the manually operated device. Compared to an attachment directly to the device housing itself, such an arrangement has, among others, the advantage of a saving in weight.

The slidability of the holder relative to the device housing is provided by a slide or tubular guidance. In such an arrangement, the supporting base is attached to the holder in a non-slidable manner so that the slidability of the base relative to the device and housing results due to the sliding action of the holder relative to the housing. A general advantage of this arrangement is that the indicator can be installed on any manually operated device as an independent unit by using an appropriate holder.

It is advantageous to locate the swivel or pivotal bearing between the supporting base and the forward end of the holder to make the angular inclination of the supporting base relative to the drive axis more easily visible due to the longer lever arm provided by such an arrangement. Especially where tubular holders are used which extend axially over a corresponding axial length of the supporting base, such a location of the swivel bearing is particularly advantageous.

To limit the relative swivelling action between the supporting base and the manually operated device, the axial length of the base at the end opposite the forward end terminates at the corresponding end of the holder. In this way, the supporting base, at the location where the largest angular displacement occurs, is limited by the holder from any further displacement. This is advantageous, especially during transportation of the manually operated device, because due to this measure no damages can occur resulting from the swinging of the supporting base.

Another important feature of the invention is the provision of a control device for determining the position of the indicator. For example, the rear end of the holder can be provided with control markings or the like which indicate the extent of the angular displacement of the manually operated device relative to the supporting base. Basically, the holder can be in the form of a tube laterally enclosed over most of its length by a tubular part of the supporting base. In such an arrangement a clear annular gap is provided between the two tubular parts so that it is possible for one to tilt relative to the other.

The rearward end of the supporting base facing away from the surface into which a member is driven should be located in the same transverse plane as the rearward end of the holder with the tubular part of the supporting base surrounding the holder concentrically when the drive axis of the device and of the supporting base are in parallel relation at right angles to the surface of the receiving material into which a member is to be driven. If the drive axis of the manually operated device is inclined from the desired perpendicular position, the annular surfaces of the tubular parts of the supporting base and the holder at the rearward end faces of each depart from the concentric arrangement and provide an indication of the misalignment of the drive axis of the device. The visual display afforded by the indicator can be corrected by an appropriate change in the position of the manually operated device. In this embodiment, the rearward end of the holder affords the visual control indicator.

In another embodiment, in accordance with the present invention, the control device can be in the form of a ring at least partially enclosing the indicator. The ring can be arranged to project radially from the rearward end of the holder. When the device is in the correct drilling or driving position, the rearward end of the supporting base projects centrically into the ring affording the desired visual position control. Further, the ring can be provided at its rearward end with a transparent disc including a reticle or cross-hair arrangement. An indicator, attachable to most of the different manually operated devices using rod-shaped penetration stops, has an essentially tubular holder which can be secured relative to the penetration stop in various positions by means of a clamping member. The penetration stops are known per se and are a part of the manually operated device. The holder is placed around the forward end of the penetration stop with the clamping member, consisting preferably of several jaws, engaging the penetration stop by frictional engagement. The frictional engagement can be achieved by spring tension. The clamping member can be positioned in recesses formed in the holder for securing the holder on the penetration stop. When the manually operating device is placed against the surface of the receiving material, the forward end of the supporting base is supported against the surface so that the indicator at the rearward end of the base displays the presence or lack of concentric position of the device so that the correct position can be achieved.

If the manually operated device is a drill, as the drill bit penetrates into the receiving material, the indicator moves opposite to the driving direction relative to the penetration stop overcoming the frictional force of the clamping member until the penetration stops engages the surface of the receiving material. At that point the penetration stop carries out its main function of penetration control while it provides the auxiliary function of forming a part of the indicator. To assure continuous contact of the supporting base with the surface of the receiving material, even during horizontally or vertically upwardly directed operation of the manually operated device, a force accumulator acts on the supporting base in the driving direction. The force accumulator can be a compression spring supported at one end of the clamping member and, at the other end, contacting the supporting base. Several windings of the compression spring laterally encircle the clamping member. The compression spring holds the indicator or the supporting base in resilient contact with the surface and, at the same time, presses the clamping member into engagement with the penetration stop.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 illustrates a manually operated apparatus including a manually operated drill and an indicator, embodying the present invention, arranged in the operating position and with a portion of the apparatus shown in section;

FIG. 2 is an enlarged sectional view of the indicator portion of the apparatus illustrated in FIG. 1 shown in the inactive position;

FIG. 3 is a transverse view, partly in section, taken along the line III—III in FIG. 1;

FIG. 4 is a transverse view similar to FIG. 3 showing the drilling or driving axis displaced out of perpendicularity with the surface of the receiving material;

FIG. 5 is a transverse sectional view of the indicator portion taken along line V—V in FIG. 2;

FIG. 6 is another embodiment of an indicator on a drill with the apparatus incorporating the indicator and drill shown in the operating position and illustrated partly in section along the line VI—VI in FIG. 7; and FIG. 7 is a plan view of the indicator portion of the apparatus taken along the direction of arrow A in FIG. 6.

DETAIL DESCRIPTION OF THE INVENTION

In the description of the manually operated apparatus shown in FIGS. 1 and 6, the forward end of the various parts is that end contacting or facing toward the surface 16 of the receiving material 17. The rearward face or end of these parts is the end facing away from or more remote from the surface of the receiving material.

FIG. 1 shows a manually operated apparatus including a manually operated drill 1 arranged for drilling a hole into the surface 16 of the receiving material 17. The drill 1 has a housing 2 to which an axially elongated penetration stop 3 is attached with the axis of the stop being secured in parallel relation to the driving or drilling axis of the drill represented by the axis of the drill bit 4. The stop 3 is secured in a clamping device 5. The penetration stop carries an indicator at its forward end with the indicator including a supporting base 7.

Basically, the supporting base 7 includes a supporting plate 7a at the forward end extending transversely of the drilling axis and a tubular shaft 7b extending rearwardly from the plate. The supporting plate 7a has a larger diameter than the tubular shaft 7b which is centrally and rigidly attached to it. At its forward end, that is, in the region of the supporting plate 7a, the supporting base 7 is centrically penetrated by a tubular holder 8 with the location in the supporting plate penetrated by the holder forming a swivel or pivotal bearing 9 between the supporting base 7 and the drill 1. The rearward or trailing end 8a of the holder 8 is located in the same transverse plane as the rearward end of the tubular shaft 7b. The radially outer surface of the holder 8 is spaced inwardly from the inner surface of the shaft 7b so that there is a uniform annular gap between these two surfaces when the drilling axis of the drill 1 and the central axis of the tubular shaft 7b are disposed in parallel relation. The penetration stop 3 extends rearwardly from the trailing end of the holder 8. A clamping member 11 secures the holder 8 on the penetration stop 3. The clamping member 11 is located within the axial extent of recesses 8b in the holder 8 and provides frictional engagement with the peripheral surface of the penetration stop 3. A compression spring 12, in the form of a helical cylindrical spring, provides the frictional engagement of the clamp 11 with the penetration stop 3 by means of its rearward windings 12a which laterally encircle the clamping member. In addition, the spring 12 bears at its rearward end against a shoulder formed on the clamping member and at its forward end it provides a biasing action on the supporting base 7.

As compared to FIG. 1, in FIG. 2 the supporting base 7 is shown in the inactive position, that is, it is not pressed against the surface 16 of the receiving material 17. In this arrangement, pressure spring 12 bears at its rearward end against the clamping member 11 and biases the holder 8 and the supporting base 7 in the drilling direction so that the rear end of the recesses 8b bears against the rearward surface of the clamping member 11. In this position of the supporting base, the forward end face of the supporting plate 7a extends beyond the end of the drill bit, not shown. Furthermore, in FIG. 2 the forward end of the compression spring 12 is supported by a ring 13 mounted on the holder 8. The ring 13 contacts a preferably elastic equalizer ring 14 which, in turn, presses against the central portion of the supporting plate 7a encircling the holder 8. Forward movement of the supporting base 7 relative to the holder 8 is prevented by means of a safety disc 15 fitted into the holder just in front of the supporting plate. The contacting surface of the supporting plate 7a is provided by an annular lip or flange encircling the circumferential periphery of the plate.

In FIG. 3 the arrangement of the supporting base 7 and the drilling or driving axis of the drill 1 can be noted with the drill bit 4 representing the axis of the drill. Centered within the supporting base 7 is the penetration stop 3. The penetration stop is surrounded by and in sliding contact with the holder 8 and the rearward end 8a of the holder appears as an annular ring. Tubular shaft 7b laterally encloses the holder 8 and is spaced radially outwardly from it. When the drilling axis of the drill 1 is maintained perpendicular to the surface 16 of the receiving material 17, as shown in FIG. 1, the rearward ends of the holder 8 and of the shaft 7b are arranged concentrically as can be seen in FIG. 3.

If during operation, the drilling axis of the drill 1 deviates from the perpendicular position, then the apparatus with its penetration stop 3 and holder 8 swivels relative to the supporting base 7 at the swivel bearing 9 when the supporting base is held in contact with the surface 16. Accordingly, the rear end 8a of the holder moves radially out of the center of the shaft 7b as displayed in FIG. 4, and the angular displacement components x, y are readily apparent. By appropriately correcting the position of the manually operated drill 1, the centered position as shown in FIG. 3 can be regained so that the perpendicularity of the drill bit 4 in the drill 1 relative to the surface 16 can be reestablished. Accordingly, the rearward end 8a functions as a control device.

FIG. 5 shows the action of the clamping member 11 consisting of two segmental jaws 18. Jaws 18 extend into the recesses 8b in the holder 8 and are in frictional engagement with the surface of the penetration stop 3. The rearward end windings 12a of the compression spring 12 laterally enclose the jaws with an initial stress securing them into contact with the stop. The recesses have an axial length such that the jaws 18 are only supported at the penetration stop and not at the bottom of the recesses 8b. It is also possible to secure the indicator by another holding means at the penetration stop 3 or at the manually operated drill 1.

In FIGS. 6 and 7 another embodiment of the supporting base 22 is illustrated and it differs from the base shown in FIGS. 1–5 primarily in the manner in which it is mounted on the surface of the receiving material and with respect to the contact between the holder 23 and the base. The supporting base consists of a three-legged supporting plate 22a and a rod-shaped shaft 22b located centrally of and extending upwardly from the plate. In the region of the transition from the supporting plate 22a to the rod-shaped shaft 22b, a spherically shaped surface 24 projects upwardly from the upper surface of the plate and engages in an exactly correspondingly shaped recess 25a in a bearing flange 25 extending laterally from and asymmetrically of the holder 23. To assure the continuous contact of the spherically shaped surfaces forming the swivel bearing, a cylindrical spring 27 extends around the shaft 22b and bears at its lower end against the upper face of the bearing flange 25 and at its upper end against a supporting ring 26 fitted on the shaft 22b.

For displaying the operating position of the drilling axis of the manually operated drill 28, shown in phantom, the rearward end of the shaft 22b projects into a ring 29 secured to and projecting laterally from the rearward end 23a of the holder 23. The inside diameter of the ring is considerably larger than the diameter of the shaft 22b to afford sufficient lateral displacement of the shaft 22b relative to the ring for signalling any misalignment of the drilling axis of the drill from perpendicularity with the surface of the receiving material. The rearward end or upwardly facing side of the ring 29 has a transparent cover disc 29a including a reticle 29b, as shown in FIG. 7. The reticle or cross hairs 29b provide the ability to determine the angular displacement of the drill 28 out of perpendicularity. Further, FIG. 7 illustrates the three-legged construction of the supporting plate 22a as well as the relationship between the supporting base 22 and the drill bit 31 mounted in the drill. The other parts of the apparatus correspond to those described with respect to the embodiment illustrated in FIG. 1. Further, the manner of operation of the two embodiments is basically the same.

While specific embodiments of the invention have been shown and described in detail to illustrate the application of the inventive principles, it will be understood that the invention may be embodied otherwise without departing from such principles.

What is claimed is:

1. Manually operated apparatus for driving a member such as a tool or fastening element along a drive axis into a receiving material including a manually operated device for driving the member along the drive axis into the receiving material and means attached to said device for providing a visual indication of the angular disposition of the drive axis of the member relative to the surface of the receiving material into which it is being driven for positioning the member perpendicularly to the surface of the receiving material, wherein the improvement comprises a base arranged to be supported on the surface of the receiving material adjacent the location at which the member is to be driven into the receiving material, means attached to said device and connected to said base for affording an indication of the angular disposition of the drive axis of the member being driven by said device relative to the surface of the receiving material into which it is to be driven, said means being pivotally supported on said base for affording the visual indication of the angular disposition of the drive axis and for positioning the drive axis perpendicularly to the surface of the receiving material, said means comprises an axially elongated holder spaced laterally from and extending parallel with the drive axis of said device, said holder being pivotally mounted relative to said supporting base and being slidably displaceable in the axial direction relative to said device, each of said supporting base and said holder being coextensive and extending in the axial direction of the drive axis of said device, each of said supporting base and said holder having a forward end facing in the direction in which a member is driven into the receiving material and a rearward end facing in the opposite direction, said supporting base and holder each having swivel bearing surfaces in contact with one another and located adjacent the forward end of each, and the rearward end of said supporting base and of said holder each terminate in approximately the same plane extending transversely of the drive axis of said device.

2. Manually operated apparatus, as set forth in claim 1, wherein said indicator includes a ring mounted on said holder at the end thereof spaced more remotely from the surface of the receiving material and said ring at least partially laterally enclosing said supporting base.

3. Manually operated apparatus for driving a member such as a tool or fastening element along a drive axis into a receiving material including a manually operated device for driving the member along the drive axis into the receiving material and means attached to said device for providing a visual indication of the angular disposition of the drive axis of the member relative to the surface of the receiving material into which it is being driven for positioning the member perpendicularly to the surface of the receiving material, wherein the improvement comprises a base arranged to be supported on the surface of the receiving material adjacent the location at which the member is to be driven into the receiving material, means attached to said device and connected to said base for affording an indication of the angular disposition of the drive axis of the member being driven by said device relative to the surface of the receiving material into which it is to be driven, said means being pivotally supported on said base for affording the visual indication of the angular disposition of the drive axis and for positioning the drive axis perpendicularly to the surface of the receiving material, said means comprises an axially elongated holder spaced laterally from and extending parallel with the drive axis of said device, said holder being pivotally mounted relative to said supporting base and being slidably displaceable in the axial direction relative to said device, said holder is tubular and extends in substantially parallel relation with the drive axis of said device, said means includes a penetration stop secured to said device and extending therefrom in the driving direction of said device and in parallel with the drive axis thereof, and a clamping member for securing said holder at variable positions on said penetration stop.

4. Manually operated apparatus, as set forth in claim 3, including a force accumulator arranged between said means and said supporting base for biasing said supporting base in the driving direction of said device.

5. Manually operated apparatus, as set forth in claim 4, wherein said force accumulator comprises a compression spring supported between said clamping member and said supporting base, and the end windings of said compression spring laterally enclose said clamping member.

6. Manually operated apparatus for driving a member such as a tool or fastening element along a drive axis into a receiving material including a manually operated device for driving the member along the drive axis into the receiving material and means attached to said device for providing a visual indication of the angular disposition of the drive axis of the member relative to the surface of the receiving material into which it is being driven for positioning the member perpendicularly to the surface of the receiving material, wherein the improvement comprises a base arranged to be supported on the surface of the receiving material adjacent the location at which the member is to be driven into the receiving material, means attached to said device and connected to said base for affording an indication of the angular disposition of the drive axis of the member being driven by said device relative to the surface of the receiving material into which it is to be driven, said means being pivotally supported on said base for affording the visual indication of the angular disposition of the drive axis and for positioning the drive axis perpendicularly to the surface of the receiving material, said means comprises an axially elongated holder spaced laterally from and extending parallel with the drive axis of said device, said holder being pivotally mounted relative to said supporting base and being slidably displaceable in the axial direction relative to said device, said supporting base comprises a supporting plate extending transversely of the drive axis of said device and located forwardly of said device in the driving direction, a tubular shaft centrally secured to said plate and extending therefrom in parallel with the axial direction of the drive axis of said device in the direction toward said device, said means comprises a tubular holder positioned within and spaced inwardly from the inner surface of said tubular shaft providing an annular gap therebetween, the ends of said tubular shaft and said holder being located in a common plane extending transversely of the drive axis of said device, a penetration stop secured to said drill and extending in the axial direction of the drill axis thereof into said holder, a clamping member for securing said holder onto said penetration stop, said tubular shaft and holder being slidably displaceable relative to said penetration stop, and the end of said holder more remote from said drill and the juxtaposed surfaces of said supporting plate forming a swivel bearing for angular displacement of said penetration stop and holder relative to said tubular shaft when the drill axis of said device is displaced out of perpendicularity with the surface of the receiving material against which said supporting plate is positioned in contacting engagement.

7. Manually operated apparatus for driving a member such as a tool or fastening element along a drive axis into a receiving material including a manually operated device for driving the member along the drive axis into the receiving material and means attached to said device for providing a visual indication of the angular disposition of the drive axis of the member relative to the surface of the receiving material into which it is being driven for positioning the member perpendicularly to the surface of the receiving material, wherein the improvement comprises a base arranged to be supported on the surface of the receiving material adjacent the location at which the member is to be driven into the receiving material, means attached to said device and connected to said base for affording an indication of the angular disposition of the drive axis of the member being driven by said device relative to the surface of the receiving material into which it is to be driven, said means being pivotally supported on said base for affording the visual indication of the angular disposition of the drive axis and for positioning the drive axis perpendicularly to the surface of the receiving material, said means comprises an axially elongated holder spaced laterally from and extending parallel with the drive axis of said device, said holder being pivotally mounted relative to said supporting base and being slidably displaceable in the axial direction relative to said device, said supporting base comprises a three-legged supporting plate for placement in surface contact with the surface of the receiving material into which a member is to be driven by said device, a rod-shaped shaft secured to the center of said plate and extending therefrom toward said drill in substantially parallel relation with the drill axis of said drill, said means comprise a holder spaced laterally outwardly from said rod-shaped shaft and extending in substantially parallel relation with the drill axis of said drill, said holder being coextensive with said rod-shaped shaft and the ends of said holder and said shaft spaced more remote from the receiving material when said supporting plate contacts the receiving material being located in a common plane extending transversely of the drill axis of said drill, a penetration stop secured to said drill and extending therefrom into said holder so that the penetration stop and said holder are coaxially arranged, a flange located at the end of said holder closer to the receiving material and having a spherically shaped bearing surface formed therein, said supporting plate having a spherically shaped projection thereon facing toward said drill and said surface corresponding to the spherical surface on said flange for contact therewith for forming a swivel bearing for said drill, spring means for biasing said spherical surfaces of said swivel bearing into contact with one another, and a ring secured to said holder and being concentric with the end of said shaft closer to said drill when said shaft and the drill axis of said drill are in parallel relation, said control ring having indicator means therein for indicating the displacement from perpendicularity of the drill axis in said drill relative to the surface of the receiving material when said supporting plate is in contact with the surface of the receiving material.

* * * * *